United States Patent Office 3,753,998
Patented Aug. 21, 1973

3,753,998
COMPOSITION AND PROCESS FOR PRODUCING POLYAMIDE-IMIDE AND POLYAMIDE POLYMERS
Edwin F. Morello, Naperville, Ill., assignor to Standard Oil Company, Chicago, Ill.
No Drawing. Continuation-in-part of abandoned application Ser. No. 147,238, May 26, 1971. This application Apr. 24, 1972, Ser. No. 246,576
Int. Cl. C08g 20/08, 20/32, 51/44
U.S. Cl. 260—30.2 R   33 Claims

ABSTRACT OF THE DISCLOSURE

A polyamide-imide or polyamide prepared by heating in a solvent the following three reactants: (1) trimellitic anhydride, or isophthalic acid, or mixtures thereof, (2) aromatic diamines and (3) lactams or amino acids wherein the molar ratio of the trimellitic anhydride or isophthalic acid to the aromatic diamine to the lactams is about 1:1:0.3 to about 1:1:2.5. A process for preparing these polyamide-imides is also disclosed. These polyamide-imides are useful as insulating coatings for electrical wire and in molded articles.

---

This is a continuation-in-part application of Ser. No. 147,238, filed May 26, 1971 by the same inventor, now abandoned.

This invention relates to high molecular weight polymers derived from trimellitic anhydride or isophthalic acid or mixtures thereof, diprimary diamines and lactams or amino acids. This polymer is useful as a magnet wire enamel in the protection of electrically conducting metallic wire such as copper and aluminum. It also is useful as an adhesive and in the fabrication of molded articles. Other wire enamel polymers such as polyimide from pyromellitic anhydride and aromatic diamines are known. However, new and different polymers are desirable in view of the cost of the polyimide and different properties attainable through a polymer of a different composition.

These polymers are useful as laminates, films, fibers, molding resins and wire enamel coatings both as a topcoat or base coat, adhesives and varnishes and in any use where an organic polymer with good thermal properties and a relatively low softening point would be useful.

The polymers of this invention may be described as polyamide-imides or polyamides produced advantageously by heating in a solvent the following three reactants: (1) trimellitic anhydride or isophthalic acid, (2) diprimary aromatic diamines and (3) lactams or amino acids. The molar ratio of the above three reactants varies from about 1:1:0.3 to about 1:1:2.5.

The ratio of the diprimary diamine to the isophthalic acid or trimellitic anhydride or the mixture of the two is preferably equimolar. Variations with limits of plus or minus three mole percent of either of these reactants will usually have only a minor effect on product properties. Variations as high as plus or minus ten mole percent may be suitable for less demanding applications than wire coating enamels from the standpoint of high flexural requirements. The polymer aliphatic content can be varied by altering the amount of lactam or amino acid added and a wide range of polymer properties are possible. The aliphatic content of the polymer can vary from about 5 to about 50 percent of the total weight of the total polymer.

The novel polyamide-imides incorporate linear units similar to structures A and B below, when trimellitic acid anhydride is one of the reactants, but some cross-linking is not excluded. These polymers contain various structures but structures A and B are representative:

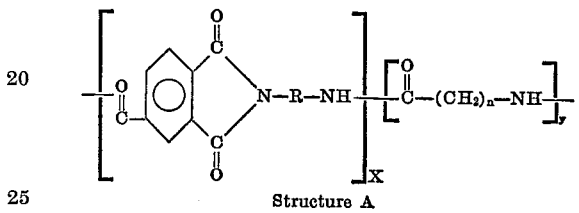

Structure A

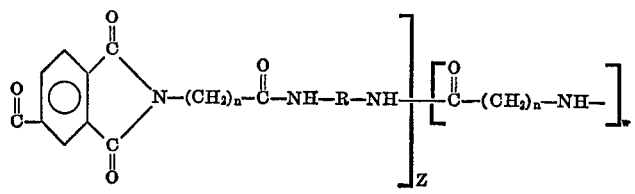

Structure B wherein R is a divalent organic radical. This organic radical consists of R', which is a divalent aromatic hydrocarbon radical or two R' divalent aromatic hydrocarbon radicals joined by stable linkages

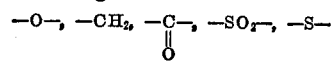

as are in the groups

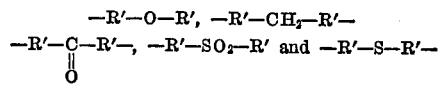

The value for $n$ can range from 1 to about 30, preferably 3 to 10. X and Z have to be at least 1 but the maximum value can range to an excess of 100. The values for Y and W can be zero or any integer, usually it is about 1 to 10 but it can exceed 20.

The process for preparing polyamide-imides comprises heating at elevated temperatures in a solvent and preferably in the presence of at least 0.01% catalyst of the group lead monoxide, boric acid, boric anhydride, polyphosphoric acid, phosphoric acid, trialkyl phosphite, triarylalkyl phosphite, triaryl phosphite and trialkaryl phosphite (A) trimellitic anhydride or isophthalic acid, (B) diprimary aromatic diamines and (C) lactams or amino acids wherein the molar ratio of trimellitic anhydride to the aromatic diamines to the lactams or amino acids is about 1:1:0.3 to about 1:1:2.5.

The polyamide-imide forming reaction of this invention is carried out at a temperature of about 200 to 250° C.

and preferably in the range of about 220 to 235° C. when atmospheric pressure is used. The reaction is conducted at as high a solids concentration as conveniently possible, preferably at least 70% so that a high reaction temperature is attainable at atmospheric pressure.

The catalyst used is present in an amount of at least about 0.01%, usually about 0.01 to 4.0% based on the weight of reactants, and preferably 0.4 to 1.5% on this basis. Lead monoxide, boric acid, boric anhydride, phosphoric acid, polyphosphoric acid, triaryl phosphites and trialkyaryl phosphites such as triphenyl and tritolyl phosphites as well as trialkyl phosphites and triarylalkyl phosphites such as tribenzyl phosphite are catalyst which are useful in the process of this invention. Preferably, the individual alkyl groups of the trialkaryl-, trialkyl- and triarylalkyl phosphites are lower alkyl groups containing about 1 to about 7 carbon atoms. Boric acid, boric anhydride, triphenyl phosphite and lead monoxide are the preferred catalysts.

The catalyst can be added to the reaction vessel initially along with the reactants and solvent or can be withheld until the reaction temperature is reached. The catalysts are preferably added after reaction temperature has been reached and maintained for a few hours. Apparently, the catalysts of this invention are most effective if added after reaction temperature is reached and maintained for a substantial length of time.

Solvents useful in this invention are high boiling liquids such as N-methylpyrrolidone, dimethylacetamide, dimethyl formamide, dimethyl sulfoxide, cresylic acids and meta and para cresol, which dissolve all three reactants and permit a reaction temperature above 200° C. The preferred solvents are N-methylpyrrolidone, meta cresol and cresylic acid.

Generally the diprimary aromatic diamines have from 1 to about 4 aromatic rings and advantageously from 1 to about 2 aromatic rings. The diprimary aromatic diamine having more than one aromatic ring may be further characterized as polycyclic aromatic compounds having two primary amino groups on an inter-connected polycyclic aromatic nucleus. Aromatic rings may be interconnected by condensation as a naphthalene or phenanthrene or may be bridged directly as in diphenyl diamines, or indirectly as, for example 2–R' groups joined with stable inert linkages such as oxy, alkyl, carbonyl, sulfonyl or sulfide, and other groups as hereinbefore described. The alkyl group may be illustrated by methylene, ethylene and substituted derivatives such as dimethylmethylene and the like.

The aromatic diprimary diamines useful in this invention have one or more aromatic rings and two primary amino groups. These aromatic diamines have the formula $H_2N-R'-NH_2$, $H_2N-R'-O-R'-NH_2$,

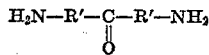

$H_2N-R'-SO_2-R'-NH_2$ and $H_2N-R'-S-R'-NH_2$, wherein R' is a divalent aromatic hydrocarbon radical hereinbefore indicated.

Lactams useful for the novel process include butyrolactam, caprolactam, capryllactam, and lauryllactam. The incorporation of these lactams in the novel polymer render a polymer with good flexural properties. The on-wire properties are superior to polyamide-imide coatings not containing lactams. Amino acids can be used in place of lactams. 4-amino butyric acid is a representative amino acid.

In a preferred embodiment trimellitic anhydride is reacted with a diprimary diamine and E-caprolactam. By way of a particular example 0.75 mole of methylenebis- aniline and 1.19 moles of E-caprolactam were heated in N-methylpyrrolidone to a temperature of about 100° C. 0.75 mole of trimellitic anhydride was added and then the reaction temperature was raised to about 200° C. The water of imidization was distilled off and the boric acid or boric anhydride catalyst was added. The temperature was raised to about 225° C. and held. The solvent was then solwly distilled off. After proper viscosity had been reached, the solution was cooled slowly to room temperature. Solvent for dilution can be added slowly to the reaction mass. This helps cooling and facilitates solution. Wire enamel solutions were prepared by diluting the polyamide-imide polymer composition to an 18–25% polymer level. The wire enamel displayed good thermal, electrical, and flexural properties.

The new polymers when used as an insulating coating for electrical wire generally have application in intermediate thermally rated systems. The coatability of these polymers is better than for polyester products used as insulation coating or for the aromatic polyamide-imide products which do not contain lactams or amino acids.

These new polymers are also particularly useful in molding applications where the relatively low softening temperature makes these polymers more amenable to injection molding than the high temperature polymers currently known in the art. The softening temperature of these polymers also renders them useful as adhesives.

The following examples describe polymer preparation, coated wire preparation and tests, and molded article preparation and evaluation. The coated wire tests are described in Example I. Table I summarizes the reaction components, catalysts, solvents, reaction conditions, and solution viscosity for Examples IV–XIV. Table II presents wire coating data for Examples V, VI and VIII. Table III presents data from Example XV on molded articles.

EXAMPLE I

Polymer preparation

A mixture of 148.5 g. (0.75 mole) of methylenebisaniline, 135 g. (1.19 moles) of E-caprolactam, and 200 gm. of N-methylpyrrolidone was prepared in a 2 liter three neck flask equipped with a stirrer and nitrogen purge system. A silicone oil bath was used for heating. The temperature was increased to 100° C. and stirring continued until a homogeneous melt phase resulted. 144 g. (0.75 moles) of trimellitic anhydride was then added in 3 or 4 portions over 20 minutes. The reaction exotherm increased the temperature to 115.0° C. External heat was then applied to raise the temperature to 220° C. Water of imidization began to distill at 160° C. For a period of about one and one-half (1½) hours at 220° C. 68 cubic centimeters of N-methylpyrrolidone was distilled. The reaction was then cooled to 220° C. to avoid frothing and 2.9 g. of boric acid was added. The temperature again was raised to 225° C. and held. N-methylpyrrolidone was slowly distilled and 90 cubic centimeters of it were distilled over a period of seven hours at 220–225° C. Viscosity of the hot melt gradually increased and it was controlled by the amount of N-methylpyrrolidone distilled. When the polymerization was completed, 830 cubic centimeters of N-methylpyrrolidone solvent was added in portions and the hot solution cooled with stirring to a homogeneous viscous solution. The final polymer had a Brookfield viscosity of 48.5 poises at 23.4° C. The percent solids or the polymer content was 24.5% determined by heating a 1 g. sample of solution for 12 min. at 600° F. Films cast on glass panels at 500° F. were very flexible and strong and had a good thermal rating.

Solutions for wire coating were prepared by diluting to an 18–20% polymer level. These solutions had a Brookfield viscosity of 20 poises at 23.2° C.

Coated wire tests

The wire enamels in the examples were coated on a 24 foot two zone, vertical, forced air enameling oven. Six coating passes were used to apply the proper insulation thickness. The wire thickness was 18 AWG. The coated magnet wire was tested according to ASTM D-1676 for film thickness, film flexibility and adherence and unidirectional scrape resistance. Short term thermal stability or burnout was determined by subjecting a twisted pair of wires to a current of 36 amps for 180 seconds, 38 amps for 180 seconds, etc. until the magnet wire lost its insulation properties.

The flexibility and adhesion were tested according to ASTM D-1676. To be amenable to automatic winding and normal abuse the wire should take a full snap. This means it should be capable of being drawn rapidly to break and have the stretched portions of the coating on the wire remain integral, i.e., it should have no cracks (brittleness) and it should not "tube" or separate from the substrate (poor adhesion). In addition to passing this snap adhesion test it is desirable that the stretched portion of a wire which has been stretched either 20% of its original length (20% jerk) or to the breaking point (full snap) be capable of being wound about a mandrel as small as possible. The mandrels used are 1, 2, 3, etc. times the wire diameter and are named 1X, 2X, 3X, etc. Hence a rating terminology for magnet wire flexural properties is full snap- or 20% jerk-SPM (smallest passing mandrel). Normally the 20% jerk test is considered more realistic in regard to commercial usage with a value of 1X being considered the top rating. A 20% jerk-SPM of 2 is considered very good, 3 is acceptable, 4 is a marginal pass-fail and 5 is failure.

Evaluation

The polymer from Example I was coated as described above. The coated wire was very smooth and blister free. Evaluation data for various cure temperatures is shown below.

|  | Wire Sample— | | | |
| --- | --- | --- | --- | --- |
|  | 1 | 2 | 3 | 4 |
| Application speed, feet per minute (f.p.m.) | 35 | 35 | 35 | 35 |
| Cure temperature, °F | 650 | 700 | 750 | 800 |
| Bottom temperature, °F | 500 | 500 | 500 | 500 |
| Diameter increase after the coating had been added (build), mils | 2.5 | 2.4 | 2.3 | 2.1 |
| 20% jerk plus SPM | 1X | 1X | 1X | 1X |
| SNAP plus SPM | 1X | 2X | 2X | (¹) |

¹ SNAP only.

EXAMPLE II

In a manner identical to Example I polymerization was conducted utilizing 80 cc. of N-methylpyrrolidone solvent and boric acid catalyst. The run time at 225° C. was extended to 10½ hours. Solutions for wire coating were prepared by diluting to 19% polymer level with commercial cresylic acid (9PX) (a composition approximately 48–55% phenol, approximately 15–33% of mixed ortho, meta and para cresol isomers and 9–19% xylenols and about 5% other C9 substituted phenols) and adding 0.5% guanidine carbonate bonding additive. A solution viscosity of 34 poises at 24.2° C. resulted. Copper wire coated with this solution was blister free but had some sandiness. Flexural properties at lower cure ranges were equivalent to wire coated from N-methylpyrrolidone solution. Enameling conditions and coated wire properties are shown in the following table:

|  | Wire Sample— | |
| --- | --- | --- |
|  | 5 | 6 |
| Speed, f.p.m | 35 | 35 |
| Cure temperature, °F | 700 | 800 |
| Bottom temperature, °F | 500 | 500 |
| Build, mils | 1.9 | 1.9 |
| 20% jerk plus SPM | 1X | 4X |
| SNAP plus SPM | 2X |  |

EXAMPLE III

In a manner identical to Example No. I, the polymerization reaction was conducted with reagents in a 1:1:1 molar ratio. A mixture of 288 gm. of trimellitic anhydride (1.5 moles), 297 g. of methylenebisaniline (1.5 moles) and 170 g. of caprolactam was heated with 400 grams of N-methylpyrrolidone. The mixture was heated to 200–220° C. for 1½ hr. and 5.84 gm. of boric acid catalyst was then added. Reaction temperature was increased slowly to 225–228° C. by distilling 207 cc. of N-methylpyrrolidone. This temperature was maintained for 6½ hours. Dilution with 2445 cc. of N-methylpyrrolidone resulted in a Brookfield viscosity of 31 poises at 23.2° C. The polymer content (percent solids) for this solution was 25%.

Solutions were further diluted for wire coating experiments to 23% solids and a viscosity of 19.3 poises at 23.9° C. Enameling conditions and coated wire properties are shown below.

|  | Wire Sample— | | |
| --- | --- | --- | --- |
|  | 7 | 8 | 9 |
| Speed, f.p.m | 30 | 30 | 45 |
| Cure temperature, °F | 700 | 750 | 800 |
| Bottom temperature, °F | 500 | 500 | 550 |
| Build, mils | 2.1 | 2.1 | 2.1 |
| 20% jerk plus SPM | 1X | 3X | 2X |
| Burnout, seconds | 330 | 340 | 270 |

EXAMPLE IV

In a manner identical to Example No. III polymerization was carried out using m-phenylenediamine as the reactant. Thus a solution of 163 gm. (1.5 moles) of m-phenylenediamine and 170 gm. of caprolactam in 400 ml. of N-methylpyrrolidone was reacted with 288 gm. of trimellitic anhydride (1.5 moles) at 70° C. The temperature/time flow chart followed exactly Example No. III and the various reaction mass was finally diluted with 900 ml. of N-methylpyrrolidone to give a polymer solution with a Brookfield viscosity of 87 poises measured at 22.0° C. at 34.5% solids level.

Films cast on a glass panel were strippable.

EXAMPLE V

Polyamide-imide polymers were prepared using phenolic solvents for the fusion medium replacing the N-methylpyrrolidone solvent of Example No. I. 1.5 moles, each of trimellitic acid anhydride (TMA), methylenebisaniline (MBA) and caprolactam were heated in 225 cc. of metacresol. Boric anhyride (5.84 g.) was used as catalyst and reaction temperature reached 232° C. in final stages of polymerization. The total run time was 7½ hours. Final dilution was made with cresylic (9PX) to a solids level of 24.7%. Brookfield viscosity of this polymer solution was 205 poises at 24.3° C.

A polymer solution suitable for wire coating was prepared by diluting with cresylic 9PX to 19.6% solids and adding 0.5% guanidine carbonate bonding agent. This solution had a viscosity of 32.6 poises at 25.7° C. and was used directly in wire coating. Further data is presented in Table II.

EXAMPLE VI

Triphenyl phosphite catalyst (5.84 g.) was added to the polyamide-imide prepolymer in Example No. I after the initial 200° C./1½ hour preheat phase. The melt phase temperature was taken as rapidly as possible to 226° C.

and maintained at this temperature with stirring. With heating, polymerization proceeded further and viscosity of the hot melt gradually increased. Viscosity was controlled by adding small amounts of N-methylpyrrolidone solvent and the reaction was continued as long as adequate stirring could be maintained. This usually required 7½ hours at the 225° C. reaction temperature. At this point, the viscous melt was diluted to 27.3% solids by slow addtiion of 1500 cc. of NMP. The final polymer solution had a Brookfield viscosity of 20.8 poises at 25.5° C. Films cast on glass panels were flexible and strong and improved in thermal rating. Films cured at 500° F. for 1 hour did not discolor.

These solutions were used directly in wire coating tests. Coatability of this formulation was excellent, giving smooth and blister free polymer coatings. The on-wire physical properties are shown in Table II.

EXAMPLE VII

In a manner identical to Example VI the reaction was conducted with litharge, lead monoxide, (PbO), as catalyst. A mixture of 288 b. of TMA (1.5 moles), 297 g. MBA (1.5 moles) and 170 g. of caprolactam was heated with 5.84 g. of catalyst. A maximum 225° C. reaction temperature was used and run time was extended slightly to 10¾ hours. The final polymer melt, diluted to 31.3% solids with 1500 cc. of NMP, had a Brookfield viscosity of 29.6 poises at 23.5° C. Polymer properties were acceptable.

EXAMPLE VIII

A polyamide was prepared by the procedure of Example I from 250 p. of isophthalic acid, 297 g. of methylenebis-aniline, and 170 g. of caprolactam. A maximum reaction temperature of 231° C. was reached and 5.84 g. of boric acid was used as catalyst. The polymer solution formed from dilution of the melt phase with N-methylpyrrolidone has a Brookfield viscosity of 10.6 poises at 24.4° C. at a 25% concentration. The wire coating data is shown in Table II.

EXAMPLE IX

A polymer was prepared by the procedure of Example VIII except that a mixture of isophthalic acid and trimellitic anhydride was reacted in a 1:1 molar ratio. Isophthalic acid (124.5 g.) and 144 g. of TMA, 297 g. of methylenebis-aniline, and 170 g. of caprolactam were heated to 231° C. in 225 cc. of N-methylpyrrolidone. Reaction time was reduced to 7 hours. The final polymer solution viscosity, after dilution to 22.5% solids was 41 poises at 26.7° C.

EXAMPLE X

To a flask equipped with an inert gas inlet, a stirrer, a thermometer, and a sampling port were charged 297 g. (1.5 moles) of methylenebis-aniline (MBA), 127.5 g. (1.5 moles) of γ-butyrolactam and 225 cc. of N-methylpyrrolidone solvent. This mixture was heated to 70–90° C. and 288 g. (1.5 moles) of trimellitic anhydride (TMA) was adfded in portions over a twenty minute period. The reaction mixture with some suspended TMA was then heated rapidly to 200° C. and held at this temperature for 1½ hours. Water of imidization began to distill at 140–160° C. and the theoretical amount of water was collected. Boric anhydride catalyst (5.84 g.) was then added and the reaction temperature was increased to 220–228° C. Stirring was continued and this temperature was maintained for an additional 7½ hours during which time 55 cc. of NMP solvent distilled. Reaction viscosity slowly increased and was controlled by adding small amounts of NMP as needed. The reaction mixture was diluted hot with 1300 cc. of NMP solvent to give a clear homogeneous solution. Brookfield viscosity was 110 poises at 24.4° C. at a solids level of 23.8%.

EXAMPLE XI

A polyamide-imide polymer was prepared by the procedure of Example X except that 4-amino butyric acid was substituted for the butyrolactam. A mixture of 204.5 g. of trimellitic anhydride (0.97 mole), 211 g. of methylenebisaniline (0.97 mole) and 55 g. of 4-aminobutyric acid (0.485 mole) was heated in 160 gm. of N-methylpyrrolidone. The mixture was heated to 200–220° C. for two hours and 5.84 g. of boric anhydride was added as catalyst. The reaction temperature was increased to 224° C. by distilling 50 cc. of N-methylpyrrolidone. This temperature was maintained for 6 hours to complete polymerization. Dilution with 1260 g. of N-methylpyrrolidone gave a homogeneous viscous solution with a Brookfield viscosity of 38.5 poises at 25.6° C. The polymer content of this solution was 22.75%.

These solutions were used directly in wire coating without further dilution. Coatability of this formulation was excellent, giving smooth and blister free polymer coatings. The coating conditions and on-wire physical properties are shown below:

|  | Wire Sample— | | | |
| --- | --- | --- | --- | --- |
|  | 10 | 11 | 12 | 13 |
| Speed/f.p.m | 30 | 30 | 30 | 30 |
| Cure temperature, ° F | 800 | 850 | 850 | 850 |
| Bottom temperature, ° F | 550 | 550 | 600 | 625 |
| Build, mils | 2.3 | 2.4 | 2.3 | 2.8 |
| 20% jerk plus SPM | 2X | 2X | 2X | 4X |
| SNAP plus SPM | 3X | 3X | Fail | 5X |
| Burnout, seconds | 735 | 730 | 735 | 765 |

EXAMPLE XII

In a manner identical to Example No. I, the polymerization reaction was conducted in cresylic 9PX solvent. A mixture of 288 gm. of trimellitic anhydride (1.5 moles), 297 g. of methylenebisaniline and 170 g. of caprolactam was heated with 225 grams of cresylic 9PX. The mixture was heated to 200–220° C. for 1½ hr. and 5.84 gm. of boric acid catalyst was then added. Reaction temperature was increased slowly to 225–228° C. by distilling off some of the solvent. This temperature was maintained for 6½ hours. Dilution with additional cresylic 9PX gave a Brookfield solution viscosity of 71.8 poises at 24.5° C. The percent solids for this solution was 21.3%.

EXAMPLE XIII

In a manner identical to Example No. I, the polymerization reaction was conducted without a catalyst. A mixture of 288 gm. of trimellitic anhydride (1.5 moles), 297 g. of methylenebisaniline and 170 g. of caprolactam was heated with N-methylpyrrolidone solvent. The mixture was heated to 200–220° C. for 1½ hr. Reaction temperature was increased slowly to 225–228° C. by distilling off some of the N-methylpyrrolidone. This temperature was maintained for 6½ hours. Dilution with further solvent produced a Brookfield viscosity of 282 poises at 25° C. The polymer content (percent solids) for this solution was 36.3%.

Films cast on a glass panel were strippable, but were weaker than those made from polymers prepared with catalysts.

EXAMPLE XIV

In a manner identical to Example No. III polymerization was carried out using p,p'-oxybis (aniline) as the reactant. Thus a solution of 303 gm. (1.5 moles) of p,p'-oxybis (aniline) and 270 gm. of caprolactam (2.34 moles) in 400 ml. of N-methylpyrrolidone was reacted with 288 gm. of trimellitic anhydride (1.5 moles) at 70° C. The temperature/time flow chart followed Example No. III and the viscous reaction mass was finally diluted with 2000 ml. of N-methylpyrrolidone to give a polymer solution with a Brookfield viscosity of 77.6 poises measured at 23.4° C.

EXAMPLE XV

The following example describes the conditions used for the molding of powders from the polymers of Examples I, III, IV, XI and XIV. Table III indicates some of the molding properties obtained.

The mold used was 8½ in. in diameter and 1¾ in. thick. It had a molding cavity 5½ in. in diameter. A polymer charge of about 78 grams produces a ⅛ in. thick disc. Generally, prior to being charged into the mold, the polymer molding powder should be dried to remove moisture.

The molding press was preheated to 425° F. Then, cold molding powder was charged into a cold mold and pressed at 425° F. according to the following schedule:

| Time, min.: | Pressure, p.s.i. |
|---|---|
| About 40 | [1] 0 |
| 3 | 210 |
| 2 | 420 |
| 2 | 840 |
| 1 | 1260 |
| 10 | 2100 |

[1] Contact pressure.

The mold and contents were then cooled to 350° F. under 2100 p.s.i. When this temperature was reached, the molded specimen was ejected from the mold. Properties are shown in Table III.

TABLE III.—MOLDING

| Example No. | Composition* | Ratio | Tensile, p.s.i. | Percent elongation |
|---|---|---|---|---|
| I | TMA/MBA/CAP | 1:1:9.6 | 6,470 | 3.5 |
| III | TMA/MBA/CAP | 1:1:1 | 2,095 | 1.2 |
| IV | TMA/MPDA/CAP | 1:1:1 | 3,140 | 1.7 |
| XI | TMA/MBA/ABA | 1:1:0.5 | 3,510 | 2.2 |
| XIV | TMA/OBA/CAP | 1:1:1.6 | 4,625 | 3.1 |

*See Table I for abbreviations.

I claim:

1. A polyamide-imide prepared by heating in a solvent the following three reactants: (A) trimellitic anhydride or isophthalic acid or mixtures thereof, (B) diprimary aromatic diamines and (C) lactams or amino acids wherein the molar ratio of the trimellitic anhydride to the aromatic diamines to the lactams or amino acids is about 1:1:0.3 to about 1:1:2.5, said polymer being characterized by a high thermal stability and by the ability to form insulating coating for electrical wire.

2. The composition of claim 1 wherein the reaction is conducted at a temperature of about 200° C. to 250° C.

3. The composition of claim 1 wherein the diamine is p,p'-methylenebisaniline.

4. The composition of claim 1 wherein the diamine is p,p-oxybis (aniline).

5. The composition of claim 1 wherein the amino acid is 4-amino butyric acid.

6. A polyamide-imide prepared by heating in a solvent the following reactants: (A) trimellitic anhydride or isophthalic acid or mixtures thereof, (B) aromatic diamines and (C) lactams wherein the molar ratio of the trimellitic anhydride, isophthalic acid or mixtures thereof to the aromatic diamine to the lactam is about 1:1:0.3 to about 1:1:2.5, said polymer being characterized by high thermal stability and by the ability to form insulating coating for electrical wire.

7. The composition of claim 6 wherein the diamine is p,p'-methylenebisaniline.

8. The composition of claim 6 wherein the diamine is p,p-oxybis (aniline).

9. The composition of claim 6 wherein the molar ratio of trimellitic anhydride to aromatic diamine to caprolactam is about 1:1:0.5 to about 1:1:1.8.

10. A polyamide-imide prepared by heating in a solvent the following three reactants: (A) trimellitic anhydride, (B) aromatic diamine and (C) caprolactam, wherein the molar ratio of the trimellitic anhydride to the aromatic diamine to the caprolactam is about 1:1:0.3 to

TABLE I.—COPOLYMER PREPARATIONS AND PROPERTIES[1]

| | Components | | | | | RXN conditions | | | Polymer properties | |
|---|---|---|---|---|---|---|---|---|---|---|
| Example No. | Acid | Diamine | Lactam or amino acid | Ratio | Catalyst | Fusion medium | Temp., °C. | Time | Viscosity | Solids, percent |
| IV | TMA | MPDA | CAP | 1:1:1 | Boric anhydride | NMP | 228 | 9 | 87 at 22.0° C | 34.5 |
| V | TMA | MBA | CAP | 1:1:1 | do | M-cresol | 232 | 7½ | 205 at 24.3° C | 24.7 |
| VI | TMA | MBA | CAP | 1:1:1 | TPP | NMP | 226 | 9 | 20.8 at 25.5° C | 27.3 |
| VII | TMA | MBA | CAP | 1:1:1 | Litharge (PbO) | NMP | 225 | 10¾ | 29.6 at 24.0° C | 31.3 |
| VIII | IA | MBA | CAP | 1:1:1 | Boric acid | NMP | 231 | 9 | 10.6 at 24.4° C | 25.0 |
| IX | IA:TMA (1:1) | MBA | CAP | 1:1:1 | do | NMP | 213 | 7 | 41 at 26.7° C | 22.5 |
| X | TMA | MBA | BLM | 1:1:1 | Boric anhydride | NMP | 228 | 10½ | 110 at 24.4° C | 23.8 |
| XI | TMA | MBA | ABA | 1:1:0.5 | do | NMP | 224 | 9 | 38.5 at 25.6° C | 22.7 |
| XII | TMA | MBA | CAP | 1:1:1 | do | Cresylic 9PX | 223 | 10 | 71.8 at 24.5° C | 21.3 |
| XIII | TMA | MBA | CAP | 1:1:1 | None | NMP | 234 | 11¼ | 282 at 25.0° C | 36.3 |
| XIV | TMA | OBA | CAP | 1:1:1.6 | Boric acid | NMP | 230 | 9 | 77.6 at 23.4° C | 24.4 |

[1] Process change is underlined in each example number.

NOTE.—CAP=Caprolactam; MBA=Methylenebisaniline; TPP=Triphenyl phosphite; MPDA=M-phenylenediamine; BLM=γ-Butyrolactam; IA=Isophthalic acid; NMP=N-methylpyrrolidone; ABA=4-aminobutyric acid; OBA=Oxybis aniline.

TABLE II.—WIRE COATING DATA

| Example No. | | Speed, f.p.m. | Cure temp., °F. | Bottom temp., °F. | Build, mil | 20% jerk plus SPM | SNAP plus SPM | Burnout, seconds | Scrape, grams |
|---|---|---|---|---|---|---|---|---|---|
| V | A | 30 | 700 | 500 | 1.7 | 2X | 4X | 234 | 952 |
| | B | 30 | 750 | 500 | 1.6 | 5X | Fail | 231 | |
| | C | 30 | 750 | 500 | 2.3 | 3X | Pass | 474 | 1,197 |
| | D | 45 | 800 | 550 | 2.3 | 3X | Pass | 395 | 1,576 |
| VI | A | 30 | 700 | 500 | 3.4 | 1X | 1X | 431 | 1,068 |
| | B | 30 | 750 | 500 | 3.3 | 2X | 2X | 624 | 1,830 |
| | C | 30 | 750 | 500 | 2.7 | 2X | 5X | 546 | 1,570 |
| | D | 30 | 750 | 500 | 2.1 | 3X | 5X | 514 | 1,170 |
| | E | 30 | 700 | 500 | 2.1 | 2X | 4X | 409 | 1,269 |
| VIII | A | 30 | 700 | 500 | 1.7 | 1X | 1X | 282 | |
| | B | 30 | 750 | 500 | 2.2 | 2X | 5X | 482 | 1,104 |
| | C | 30 | 800 | 500 | 2.1 | 3X | Fail | 521 | 1,184 |
| | D | 45 | 800 | 550 | | 1X | 3X | 433 | 1,120 | about 1:1:2.5, said polymer being characterized by high thermal stability and by the ability to form insulating coating for electrical wire.

11. The composition of claim 10 wherein the diamine is p,p'-methylenebisaniline.

12. The composition of claim 10 wherein the diamine is p,p'-oxybis (aniline).

13. A polyamide-imide prepared by heating in a solvent the following reactants: (A) isophthalic acid, (B) aromatic diamine and (C) caprolactam, wherein the molar ratio of the isophthalic acid to the aromatic diamine to the caprolactam is about 1:1:0.3 to about 1:1:2.5, said polymer being characterized by high thermal stability and by the ability to form insulating coating for electrical wire.

14. The composition of claim 13 wherein the diamine is p,p'-methylenebisaniline.

15. The composition of claim 13 wherein the diamine is p,p'-oxybis (aniline).

16. A coated metal wire suitable for high temperature electric service, said wire coated with the polyamide-imide of claim 1.

17. A film prepared by heating the polymer of claim 1.

18. A fiber prepared by heating the polymer of claim 1.

19. An adhesive of the polymer of claim 1.

20. A laminate having a plurality of layers bonded together with the polymer of claim 1.

21. A molded article prepared from the polymer of claim 1.

22. A process for preparing polyamide-imides which process comprises heating at elevated temperatures in a solvent (A) trimellitic anhydride, isophthalic acid anhydride or mixtures thereof, (B) diprimary aromatic diamines and (C) lactams or amino acids, wherein the molar ratio of trimellitic anhydride to the aromatic diamines to the lactams or amino acids is about 1:1:0.3 to about 1:1:2.5.

23. The process of claim 22 wherein the reaction is conducted in the presence of at least 0.01% catalyst of the group boric acid, boric anhydride, polyphosphoric acid, phosphoric acid, trialkyl phosphite, triaralkyl phosphite, triaryl phosphite, trialkaryl phosphite and lead monoxide.

24. The process of claim 23 wherein the reaction is conducted at a temperature of about 200° to about 250° C.

25. The process of claim 24 wherein the diprimary aromatic diamine is p,p'-methylenebisaniline.

26. The process of claim 24 wherein the diprimary aromatic diamine is p,p'-(oxybis) aniline.

27. The process of claim 24 wherein the lactam is E-caprolactam.

28. The process of claim 24 wherein the amino acid is 4-aminobutyric acid.

29. The process of claim 24 wherein the solvent is N-methylpyrrolidone.

30. The process of claim 24 wherein the solvent is m-cresol.

31. The process of claim 24 wherein the catalyst is boric acid or boric anhydride.

32. A molded article prepared from the polymer of claim 6.

33. A molded article prepared from the polymer of claim 10.

References Cited
UNITED STATES PATENTS

| | | | |
|---|---|---|---|
| 3,591,555 | 7/1971 | Rabiloud | 260—47 |
| 3,471,444 | 10/1969 | Sherer | 260—65 |
| 3,485,796 | 12/1969 | Naselow | 260—47 |

MORRIS LIEBMAN, Primary Examiner

R. ZAITLEN, Assistant Examiner

U.S. Cl. X.R.

260—33.4 R, 47 CP, 47 CZ, 78 A, 78 L, 78 TF

UNITED STATES PATENT OFFICE
CERTIFICATE OF CORRECTION

Patent No. 3,753,998      Dated August 21, 1973

Inventor(s) Edwin F. Morello

It is certified that error appears in the above-identified patent and that said Letters Patent are hereby corrected as shown below:

Column 3, line 47, "hereinbefore" should read -- whereinbefore --. Column 6, line 47, "various" should read -- viscous --. Column 7, line 33 "250p" should read -- 250g. --; line 61, "adfded" should read -- added --. Column 9, line 13, "themolding" should read -- The molding --; line 35, Table III "1:1:9.6" should read -- 1:1:1.6 --. Column 10, line 52, Table I under °C Example No. IX "213" should read -- 231 --; Table II, Example No. VIB "2X" should read -- 5X --; Table II, VD "1,576" should read -- 1,057 --; Table II, Wire Coating Data - under column "Scrape Grams"

| | | |
|---|---|---|
| 952 | | 952 |
| ---- | | ---- |
| 1,197 | | 1,197 |
| 1,576 | | 1,057 |
| 1,068 | should read | 1,680 |
| 1,830 | | 1,830 |
| 1,570 | | 1,576 |

Signed and sealed this 27th day of August 1974.

(SEAL)
Attest:

McCOY M. GIBSON, JR.
Attesting Officer

C. MARSHALL DANN
Commissioner of Patents